Oct. 11, 1966  L. D. EMERY, JR  3,278,849
METHODS OF AND APPARATUS FOR TESTING ARTICLES TO DETERMINE
TO WHICH OF THREE GROUPS THE ARTICLES BELONG
Filed Sept. 24, 1962
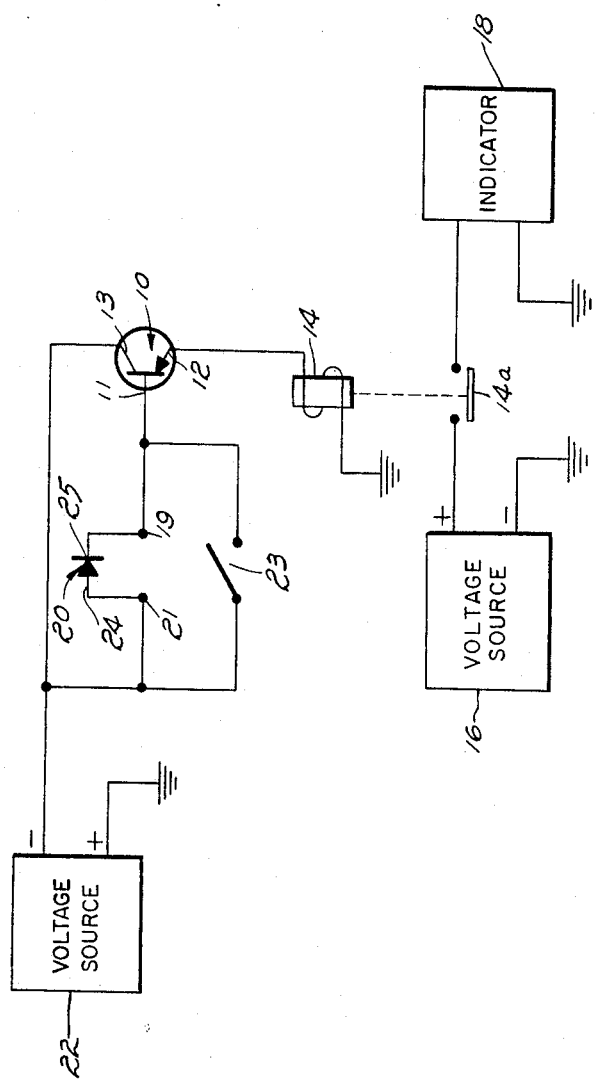
INVENTOR
L. D. EMERY JR.
BY
John L. Lipari
ATTORNEY United States Patent Office 3,278,849
Patented Oct. 11, 1966

3,278,849
METHODS OF AND APPARATUS FOR TESTING ARTICLES TO DETERMINE TO WHICH OF THREE GROUPS THE ARTICLES BELONG
Loring D. Emery, Jr., Reading, Pa., assignor to Western Electric Company, Incorporated, New York, N.Y., a corporation of New York
Filed Sept. 24, 1962, Ser. No. 225,543
5 Claims. (Cl. 324—158)

This invention relates to methods of and apparatus for testing articles and more particularly, to a method and apparatus for testing articles, such as semiconductor devices or the like, to determine to which of three groups the articles belong. Accordingly, the general objects of this invention are to provide new and improved methods and apparatus of such character.

These and other objects of the invention are accomplished by placing an article to be tested under test conditions to produce a reference signal representative of a characteristic of the article. The reference signal is then applied to a device, such as a relay, which will operate if the signal applied thereto is within a first range of values, will remain in an operated condition, once operated, if the signal applied thereto is within a second range of values, and will not operate if the signal applied thereto is within a third range of values. Accordingly, if the device operates when the reference signal is applied thereto, it indicates that the article characteristic has a value which is within the first range. If the device does not operate, it indicates that the article characteristic has a value which either lies within the second range or the third range. To determine within which of the latter two ranges the article characteristic lies, a signal is applied to the device having a value sufficient to cause operation thereof. The reference signal is then re-applied to the device and at the same time the operating signal is disconnected therefrom. If the device remains operated, it indicates that the article characteristic has a value which lies within the second range; if it fails to remain operated, it indicates that the article characteristic has a value which lies within the third range.

The invention will be more readily understood from the detailed description which follows when read in conjunction with the signal appended drawing which illustrates schemically an embodiment of the invention.

Referring now to the drawing, the apparatus illustrated therein includes a transistor, designated generally by the numeral 10, having a base 11, an emitter 12 and a collector 13. A relay 14 is connected to the emitter 12 and to ground. The relay 14 is a conventional electromechanical relay operable to energize upon one value of current passing therethrough and operable to stay energized upon the passage therethrough of a lesser value of current. Energization of the relay 14 closes a normally open contact 14a thereof, resulting in a circuit being established from a source of voltage 16 through the contact 14a to operate an indicating unit 18 which indicates the energization of the relay 14. The indicating unit 18 may be of a conventional form providing a visual, audible, or other type of indication.

The base 11 is connected to a terminal 19 adapted to receive one lead of an article to be tested. A second terminal 21 adapted to receive another lead of the article is connected to the collector 13 and to a source of adjustable D.C. voltage 22. The function of the source 22 is twofold: first, it supplies the necessary bias to the transistor 10, and second, it provides a signal to the article to be tested. In parallel with the terminals 19 and 21 is a switch 23, operable upon closure to short out the article under test and thereby connect the base 11 directly to the voltage source 22.

As an illustration, the invention will be described as being employed to test a semiconductor diode to determine to which of three groups the diode belongs according to its reverse current ($I_R$). As is well known, the reverse current of a semiconductor diode is that current which flows across the P–N junction thereof when the junction is reverse biased. The three groups into which a diode can fall according to its reverse current ($I_R$) are as follows:

(1) Group I—A reverse current ($I_R$) greater than a predetermined value $I_2$.
(2) Group II—A reverse current ($I_R$) between a predetermined value $I_1$ and $I_2$ ($I_1 < I_R \leq I_2$), and
(3) Group III—A reverse current ($I_R$) between zero and $I_1$ ($0 \leq I_R \leq I_1$).

Prior to test, the apparatus is calibrated by adjustment of the source 22 so that the relay 14 energizes upon the passage therethrough of a value of current in excess of $KI_2$, and stays energized, once energized, if the current therethrough exceeds a value $KI_1$, the factor $K$, in this instance, being the gain of the transistor 10 from the base 11 to the emitter 12. If the current is $KI_1$ or less, the relay 14 will not operate.

In operation, a diode 20 is inserted between the terminals 19 and 21 in its reverse direction, that is, its anode 24 is connected to terminal 21 and its cathode 25 is connected to terminal 19. The reverse current of the diode 20 is then amplified by transistor 10 and the amplified signal resulting therefrom is passed through the coil of the relay 14. If the relay 14 energizes, it means that the current therethrough must be greater than $KI_2$ and therefore the diode 20 belongs to Group I. However, if the relay 14 does not energize, it indicates that the diode 20 can either belong to Group II or to Group III. To determine in which of these two groups the diode 20 belongs, switch 23 is operated to its closed position. This shorts out the diode 20 and applies a large current to the base 11, which when amplified in the emitter circuit, energizes the relay 14. Upon opening of switch 23, if the diode 20 belongs to Group II, the current passing through relay 14 will be sufficient to keep the relay 14 energized; however, if the diode 20 belongs to Group III, the amplified current will not be sufficient to keep relay 14 energized and it will de-energize.

It is to be understood that the above-described arrangement is simply illustrative of the application of the principles of the invention. Thus, although manual operation has been illustrated, it should be obvious to one skilled in the art that the apparatus is easily adaptable to automatic operation. Further, although the invention has been described and illustrated as being employed to test a semiconductor diode, according to its reverse current, it should be apparent that its use is not so limited and that the invention is readily adaptable to the testing of other articles, such as transistors, resistors, etc.

Numerous other arrangements may be readily devised by those skilled in the art which will embody the principles of the invention and fall within the spirit and scope thereof.

What is claimed is:
1. The method of testing a series of articles to determine to which one of three groups each of the articles belongs according to the value of a characteristic thereof, the characteristic being one which under test conditions is capable of varying the magnitude of an electrical reference signal as a function of the value of the characteristic, which method comprises:
(A) placing each article in turn under test conditions to produce a reference signal representative of the value of the characteristic;

(B) applying the reference signal to a sensing device of the type which operates initially only when the reference signal is above a first predetermined value corresponding to a first reference value of the characteristic under test, so that the article is known to belong to a first one of the three groups whenever the device operates as a result of step (B);

(C) momentarily applying a stronger signal to the sensing device sufficient to insure that it operates whenever the device does not operate in step (B); and (D) applying the reference signal to the sensing device while the device remains operated as a result of step (C), the device being further of the type which remains operated unless the reference signal is below a second predetermined value lower than the first and corresponding to a second reference value of the characteristic under test, so that the article is known to belong to a second group whenever the device remains operated as a result of step (D) and so that the article is known to belong to a third group whenever the device does not remain operated as a result of step (D).

2. The method of testing a series of articles to determine to which one of three groups each of the articles belongs according to the value of a resistance characteristic thereof, which method comprises:

(A) applying a signal to each article in turn to obtain a responsive signal representative of the value of the characteristic;

(B) applying the responsive signal to a relay which energizes initially only when the responsive signal is above a first predetermined value corresponding to a first reference value of the resistance characteristic under test, so that the article is known to belong to a first one of the three groups whenever the relay energizes as a result of step (B);

(C) momentarily applying a stronger signal to the relay sufficient to insure that it energizes whenever the relay does not energize in step (B); and (D) applying the responsive signal to the relay while the relay remains energized as a result of step (C), the relay being further of the type which remains energized unless the responsive signal is below a second predetermined value lower than the first and corresponding to a second reference value of the resistance characteristic under test so that the article is known to belong to a second group whenever the relay remains energized as a result of step (D) and so that the article is known to belong to a third group whenever the relay does not remain energized as a result of step (D).

3. Apparatus for testing a series of articles to determine to which one of three groups each of the articles belongs according to the value of a characteristic thereof, the characteristic being one which under test conditions is capable of varying the magnitude of an electrical reference signal as a function of the value of the characteristic, which apparatus comprises:

(A) means for placing an article to be tested under test conditions to produce a reference signal representative of the value of the characteristic under consideration;

(B) a sensing device of the type which operates initially when the signal applied thereto is greater than a first predetermined value, and which remains operated, once operated, as long as the signal applied thereto is greater than a second predetermined value, less than the first;

(C) means for applying the reference signal to the device, the device operating if the reference signal is greater than the first predetermined operating value of the device, thereby indicating that the article characteristic has a value lying within a first range and that the article belongs to a first one of the groups; and (D) means selectively operable for momentarily applying an operating signal to the device in a manner such that upon the removal of the operating signal the reference signal is reapplied to the device, so that if the device does not operate upon the initial application of the reference signal thereto, an operating signal to operate the device may be momentarily applied thereto, the device remaining operated after the momentary application if the reference signal has a value greater than the second predetermined operating value of the device, indicating that the article characteristic has a value lying within a second range and that the article belongs to a second one of the groups, and the device being set to an unoperated condition if the reference signal has a value less than the second predetermined operating value, indicating that the article characteristic has a value lying within a third range and that the article belings to a third one of the groups.

4. Apparatus according to claim 3 wherein said device is a relay.

5. Apparatus for testing a series of articles to determine to which one of three groups each of the articles belongs according to the value of a resistance characteristic thereof, which apparatus comprises:

(A) first and second terminals for receiving an article to be tested;

(B) a voltage source;

(C) a relay which energizes initially when the signal applied thereto is greater than a first predetermined value and which remains energized, once energized, as long as the signal applied thereto is greater than a second predetermined value, less than the first;

(D) means for connecting the first and second terminals, the voltage source and the relay in a circuit such that (a) the signal applied to the relay is inversely proportional to the resistance across the first and second terminals, (b) the relay energizes when an article is connected to the first and second terminals if the value of the resistance characteristic of the article lies within a first range of values, and (c) the relay remains energized, once energized, if the value of the resistance characteristic of the article lies within a second range; and (E) a switch connected across the first and second terminals for selectively shorting and unshorting the terminals so that if the relay does not energize when the article is connected to the terminals, the terminals can first be shorted to increase the signal applied to the relay to energize the same and can then be unshorted so that if the resistance characteristic of the article has a value lying within the second range the relay will remain energized and if the resistance characteristic of the article has a value lying within a third range the relay will de-energize.

References Cited by the Examiner

UNITED STATES PATENTS 2,958,823   11/1960   Rabier _____ 324—133

WALTER L. CARLSON, *Primary Examiner.*

E. L. STOLARUN, *Assistant Examiner.*